(12) United States Patent
Bazzo et al.

(10) Patent No.: US 10,016,950 B2
(45) Date of Patent: Jul. 10, 2018

(54) METHOD FOR PRODUCING TRANSPARENT OR SEMI-TRANSPARENT COMPONENTS

(71) Applicant: INGLASS S.P.A., San Polo di Piave (TV) (IT)

(72) Inventors: Maurizio Bazzo, San Polo di Piave (IT); Tiziano Boscariol, San Polo di Piave (IT)

(73) Assignee: INGLASS S.P.A., San Polo di Piave (IT)

( * ) Notice: Subject to any disclaimer, the term of this patent is extended or adjusted under 35 U.S.C. 154(b) by 261 days.

(21) Appl. No.: 15/057,136

(22) Filed: Mar. 1, 2016

(65) Prior Publication Data

US 2016/0257083 A1 Sep. 8, 2016

(30) Foreign Application Priority Data

Mar. 3, 2015 (IT) ............... TV2015A0040

(51) Int. Cl.
| | |
|---|---|
| C08G 63/02 | (2006.01) |
| B29D 11/00 | (2006.01) |
| B32B 27/36 | (2006.01) |
| B32B 27/30 | (2006.01) |
| B32B 27/08 | (2006.01) |
| B29C 45/16 | (2006.01) |
| B29K 33/00 | (2006.01) |
| B29L 31/30 | (2006.01) |
| B29K 69/00 | (2006.01) |
| B29L 11/00 | (2006.01) |

(52) U.S. Cl.
CPC ........ *B29D 11/00009* (2013.01); *B29C 45/16* (2013.01); *B32B 27/08* (2013.01); *B32B 27/308* (2013.01); *B32B 27/365* (2013.01); *B29K 2033/12* (2013.01); *B29K 2069/00* (2013.01); *B29K 2995/0026* (2013.01); *B29K 2995/0087* (2013.01); *B29L 2011/00* (2013.01); *B29L 2031/30* (2013.01); *B29L 2031/3052* (2013.01); *B32B 2250/02* (2013.01); *B32B 2250/24* (2013.01); *B32B 2605/006* (2013.01)

(58) Field of Classification Search
USPC .................................. 428/411, 412
See application file for complete search history.

(56) References Cited

U.S. PATENT DOCUMENTS

| | | | | |
|---|---|---|---|---|
| 2007/0026154 A1* | 2/2007 | Yokoyama | ............... | B05D 7/00 427/372.2 |
| 2007/0290353 A1 | 12/2007 | Lin | | |

FOREIGN PATENT DOCUMENTS

| | | |
|---|---|---|
| DE | 19722551 A1 | 12/1998 |
| EP | 1695808 A1 | 8/2006 |
| EP | 2594392 A2 | 5/2013 |
| EP | 2650098 A1 | 10/2013 |
| JP | 2008290383 A | 12/2012 |

OTHER PUBLICATIONS

Interface Deveopment in Polycarbonate/Poly (Methylmethacrylate) Bilayer Film by Hutchings et al.

* cited by examiner

*Primary Examiner* — Terressa Boykin
(74) *Attorney, Agent, or Firm* — Mark M. Friedman

(57) ABSTRACT

A method is disclosed for producing a component formed by two layers (30, 40) of different, transparent or semi-transparent materials, wherein the component is molded in a mold (10) by over-molding two layers. One layer (40) is constituted by a polymer having structural characteristics and being resistant to impact, fracture or chipping, for example PC, and the other layer (30) is constituted by a polymer characterized by high scratch resistance, such as PMMA.

14 Claims, 3 Drawing Sheets

Figure 1:
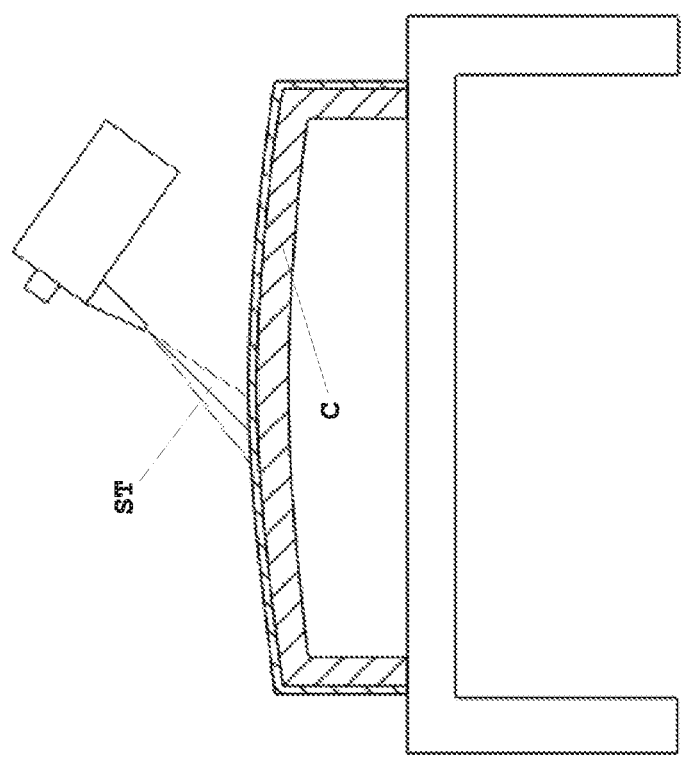

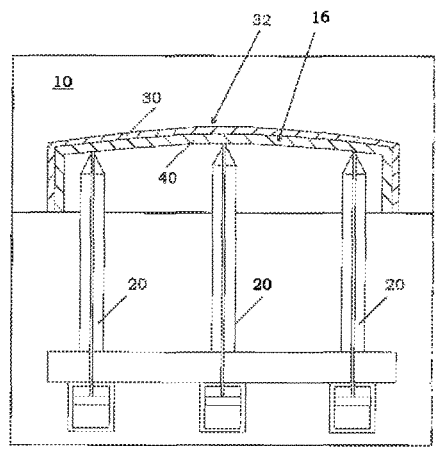 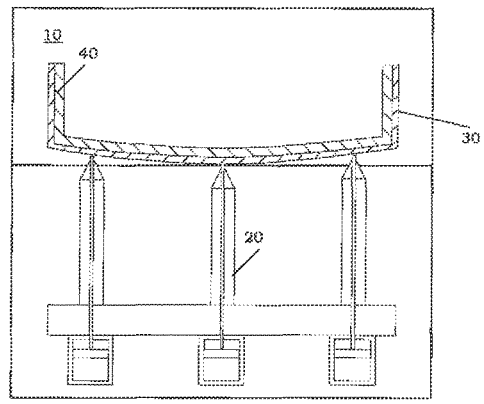
Fig. 2
Fig. 3

METHOD FOR PRODUCING TRANSPARENT OR SEMI-TRANSPARENT COMPONENTS

The invention relates to a method for producing transparent or semi-transparent components, in particular transparent or semi-transparent accessories for the bodywork of vehicles, even more particularly lenses for headlights or rear windows or sunroofs of motorcycles.

With non-limiting reference to lenses for vehicle headlights, it is easy to understand why they should be characterized by high resistance to both impact, fracture and chipping in the event of collision with external bodies (e.g. stones), and to scratching of their visible external surface.

The known production methods involve molding a component C by using a structural material (e.g. Polycarbonate, PC) and then performing a surface treatment called hard coating (FIG. 1), a procedure consisting in the deposition of a very thin layer (some μm) of material ST on the surface that in use is the external one, so as to give scratch resistance and greater hardness.

This treatment, however, has a number of disadvantages.

First of all it is a very expensive coating, which requires a dedicated production line to back up the injection molding. To obtain the final piece the blank must then be pulled out of the press and moved on the hard coating line, with increase of the production times and related costs.

Furthermore the success of the hard-coating process depends very much on the conditions of the surface on which it is applied. If the latter is characterized by excessive residual stresses, frequent in injection molding, the process is not completed in an optimal manner. A lot of waste then results.

EP 1695808 describes a decorative element for motor vehicles, characterized by a supporting part and a thermoplastic material cover part. The aim is to improve the aesthetics of the colored second part.

DE 19722551 relates to the realization of elements characterized by two interconnected and spatially distinct regions with different physical/chemical properties. The document is clearly directed at improving the appearance of external aesthetic parts of a vehicle.

EP 2650098 shows a lighting element of a vehicle characterized by a zone in which two layers of polycarbonate (PC) and/or polymethylmethacrylate (PMMA) are overlapped. The objective of the invention here is to produce means for fixing to the rest of the car.

All these documents are focused on the aesthetic quality of the components, and teach how to produce on a structural part a layer particularly suitable for polishing or varnishing.

Therefore a method is missing for producing components, in particular transparent or semi-transparent components, even more particularly those more exposed as lenses for headlights or rear windows or sunroofs, which have high resistance to impact, fracture and chipping and also are resistant to scratch on their visible outer surface.

It is desired, then, to obviate to one or more of these problems with a production method according to the appended claims, in which the dependent ones define advantageous variants.

It must be considered that the polymers used to lend high resistance to impact, fracture and chipping (for example polycarbonate, PC) at the same time have poor resistance to scratching, poor chemical resistance and poor UV degradation resistance. Conversely, the materials particularly suitable for ensuring scratch resistance (for example polymethylmethacrylate, PMMA) are unsuitable from the point of view of structural resistance.

An aspect of the invention relates to a method that allows avoiding one or more of the aforementioned problems.

The method improves the production of said transparent or semi-transparent components, and is able to produce a component constituted by two layers of different transparent or semi-transparent materials, wherein the component is molded in a mold by over-molding two layers, wherein one layer is constituted by a polymer having structural characteristics and being resistant to impact, fracture or chipping, for example PC, and the other layer is constituted by a polymer characterized by high scratch resistance, such as PMMA.

The molding sequence is indifferent to the order with which the two layers are molded. The method can be used to mould the component (i) in a single press by using two successive injections, or (ii) in two different presses, wherein in each press only one layer is molded at a time.

A first advantage of the method is the elimination of the expensive hard coating process, with following reduction of process costs and elimination of the relative production line.

Another advantage is the possibility of making the finished component directly inside the press, thereby eliminating handling times and costs.

Another advantage is the reduction of production waste.

Another advantage is that the zone concerned by the two layers of material may regard the entire component or only one or more partial areas that are isolated from each other. In particular, the two layers may be in contact along a single contact surface.

In fact it should be noted that the known hard coating process is inaccurate, being based on a spray technique or mechanical deposition. The molding accuracy in defined areas ensures a much greater relative dimensional accuracy between subparts of a final piece. Note also that using hard-coating techniques to produce components having more isolated areas of coating or having convexities, is very complicated and increases the dimensional error.

In the method the layer injected first may form a concave solid, and the layer injected second covers substantially all of the concave or convex surface of the solid, according to the molding order. Or, the layer injected second may partially cover the concave or convex surface of the solid. In both cases the molding allows an excellent and precise overlapping of the two layers even for spatially complex forms, especially as regards the resolution of the margins of the contact surface.

For "concave solid" here it is meant an object being not strictly plane, like e.g. a cap or a box-like shell.

In particular cases, such as a lens or a sunroof, the layer that partially covers the concave or convex surface of the solid may be a substantially flat or slightly curved layer. Thus a portion of the convex surface remains uncovered and withdrawn with respect to the material injected second, useful e.g. for fastening to the vehicle and/or invisible when the component is mounted.

For example the layer that partially covers the concave or convex surface of the solid may be placed substantially at the center of the solid. This allows molding e.g. symmetrical components and/or with two lateral parts adapted for assembly.

Another aspect of the invention is a lens or a sunroof or a windscreen for a vehicle comprising or consisting of a double-layer structure of transparent or semi-transparent materials, the structure comprising the superposition of a layer molded with a polymer having structural characteristics and being resistant to impact, fracture or chipping, for example PC, and a layer molded with a polymer characterized by high scratch resistance, such as PMMA.

Figure 4:
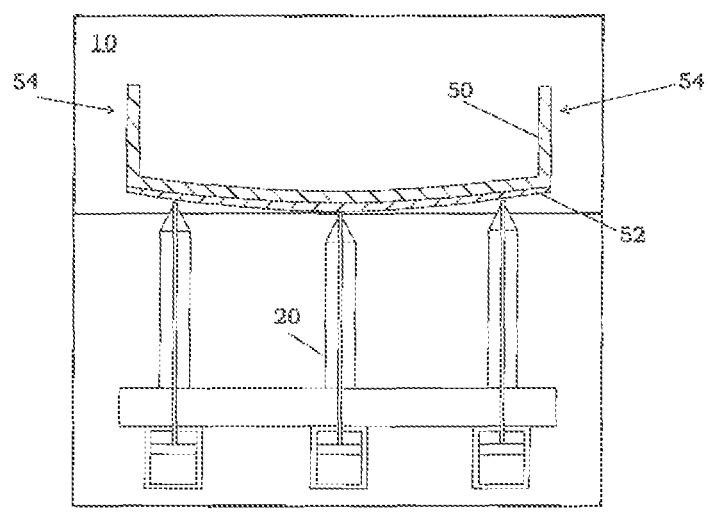

The advantages of the invention will be made even clearer by the following description of a preferred embodiment of the injection system for performing the method, in which reference is made to the accompanying drawing wherein FIG. 1 shows a production method of the known type;

FIGS. 2-4 show variants of a production system according to the invention.

In the figures same reference numerals indicate same elements, which are sometimes without references not to crowd the drawing.

The process according to the invention may be carried out, for example, on a known press of the "stack-mould" type with rotating central table, thanks to which it is possible to have two next molding stations in the same injection molding machine.

FIG. 2 shows a mould 10 in which a cavity 16 adapted to be filled by plastic material injected into the mould by known injectors 20, is formed.

Closed the mould, by successive injections of material a component can be produced with two layers 30, 40 of different materials, one over-molded to the other. The injectors 20 shown here are used for the injection of the generic second layer.

The inner layer 40 is constituted of polymer with structural characteristics such as impact, fracture resistance and resistance to chipping, for example PC.

The outer layer 30 is instead made of material characterized by high aesthetic quality and scratch resistance, such as PMMA.

It can be seen, then, that in this way the final two-layer component has an outer visible surface 32 with aesthetic and anti-scratch characteristics, but has however sufficient mechanical resistance thanks to the underlying structural layer 40.

The molding sequence can indifferently provide for the molding of the first structural part 40 and then of the scratch-resistant part 30, or vice versa.

E.g. in FIG. 2 the part 30 is injected first, while in FIG. 3 the part 40 first.

In FIGS. 2 and 3, the overlap of the two materials involves all the volume of the final component, which in fact consists in the overlapping of two scaled elements. In particular, the part 40 forms a solid concave whose convex surface is completely covered by the part 30.

By the method of the invention one may also achieve that the final component comprises two layers of material only on an area that, in use, is visible from the outside, see FIG. 4. it is sufficient to properly design the cavity 16 of the mould.

In particular in FIG. 4 it can be observed that the molded component is two-layered and always has a part 52, e.g. the central one, which constitutes the visible outer surface, with aesthetic and anti-scratch characteristics, and a structural layer 50. However in this case the part 52 only partially covers the structural layer or part 50, relatively to a surface which during the final use will remain on sight, as e.g. the outer surface of a headlight. Thus an uncovered area 54 of the component 50 remains. In other words, the solid formed by the concave part 50 has its own convex surface only partly covered by the part 52.

The area has 54 different utilities. E.g. if the molded component is a lens of the vehicle headlight, the transparent or semi-transparent part is that the frontal one visible from the outside (of the vehicle), i.e. the layer 30 or 52. The contour or no-overlap areas 54 between the two layers often have the purpose of fixing the lens to the body (case of FIG. 4), and are usually opaque (e.g. black) and do not require anti-scratch treatment. There may, however, be transparent or semi-transparent border areas, "protected" by the vehicle body and for this not in need of anti-scratch coating. For roofs or rear windows the same concept holds.

Even for the variant of FIG. 4 the molding sequence may be reversed, i.e. the part 52 may be molded first and then the part 50 is over-injected thereto. In this case, the part 52 molded first forms a concave solid having a concave surface. On all such concave surface the part 50 is over-injected.

Another variant provides that the lens is produced also with a sequence of different phases, e.g.:

molding a layer on a first press, e.g. the layer 30;

extracting the layer from the first press and inserting it in a second press (technically an "insert");

in the second press, molding a second layer, e.g. the layer 50, by over-molding it on the layer previously inserted in the second press to obtain the overall lens.

In particular, a two-layer lens (made of PC+PMMA) can then be produced by:

molding the PMMA on a first press;

inserting the layer of PMMA thus obtained in a second press (as an insert);

over-molding a layer made of PC on the layer made of PMMA.

All of the advantageous variants described above are also applicable to this last method embodiment that uses two different presses to produce one layer at a time.

The invention claimed is:

1. Method for producing a molded component,
the component being
a lens or a sunroof or a windscreen for a vehicle, and
formed by two layers (30, 40) of different, transparent or semi-transparent materials,
with the steps of
providing one layer consisting of a polymer having structural characteristics and being resistant to impact, fracture or chipping, and
providing another layer consisting of a polymer characterized by high scratch resistance;
over-molding the two layers in a mold thereby molding the final component.

2. Method according to claim 1, wherein the component is molded with a sequence which first provides for the molding of said one layer and then of said other layer, or vice versa.

3. Method according to claim 2, wherein one layer is molded in a press and the other layer is molded in a different press by over-molding it to the said one layer.

4. Method according to claim 1, wherein the two layers are in contact along a single contact surface.

5. Method according to claim 1, wherein the layer injected first forms a concave solid, and the layer injected second covers all the concave or convex surface of the solid.

6. Method according to claim 1, wherein the layer injected first forms a concave solid, and the layer injected second partially covers the concave or convex surface of the solid.

7. Method according to claim 6, wherein the layer that partially covers the concave or convex surface of the solid is a flat or slightly curved layer.

8. Method according to claim 6, wherein the layer that partially covers the concave or convex surface of the solid is placed at the center of the solid.

9. Component produced by the method of any one of the preceding claims.

10. Lens or sunroof or windscreen for a vehicle, comprising or consisting of a two-layer structure made of transparent or semi-transparent materials, the structure comprising the superposition of
   a layer molded with a polymer having structural characteristics and being resistant to impact, fracture or chipping, and
   a layer molded with a polymer characterized by high scratch resistance.

11. Lens or sunroof or windscreen for a vehicle as in claim 10, wherein the polymer having structural characteristics and being resistant to impact, fracture or chipping is polycarbonate.

12. Lens or sunroof or windscreen for a vehicle as in claim 10, wherein the polymer characterized by high scratch resistance is polymethylmethacrylate.

13. Method according to claim 1, wherein the polymer characterized by high scratch resistance is polymethylmethacrylate.

14. Method according to claim 1, wherein the polymer having structural characteristics is polycarbonate.

* * * * *